United States Patent Office 2,756,018
Patented July 24, 1956

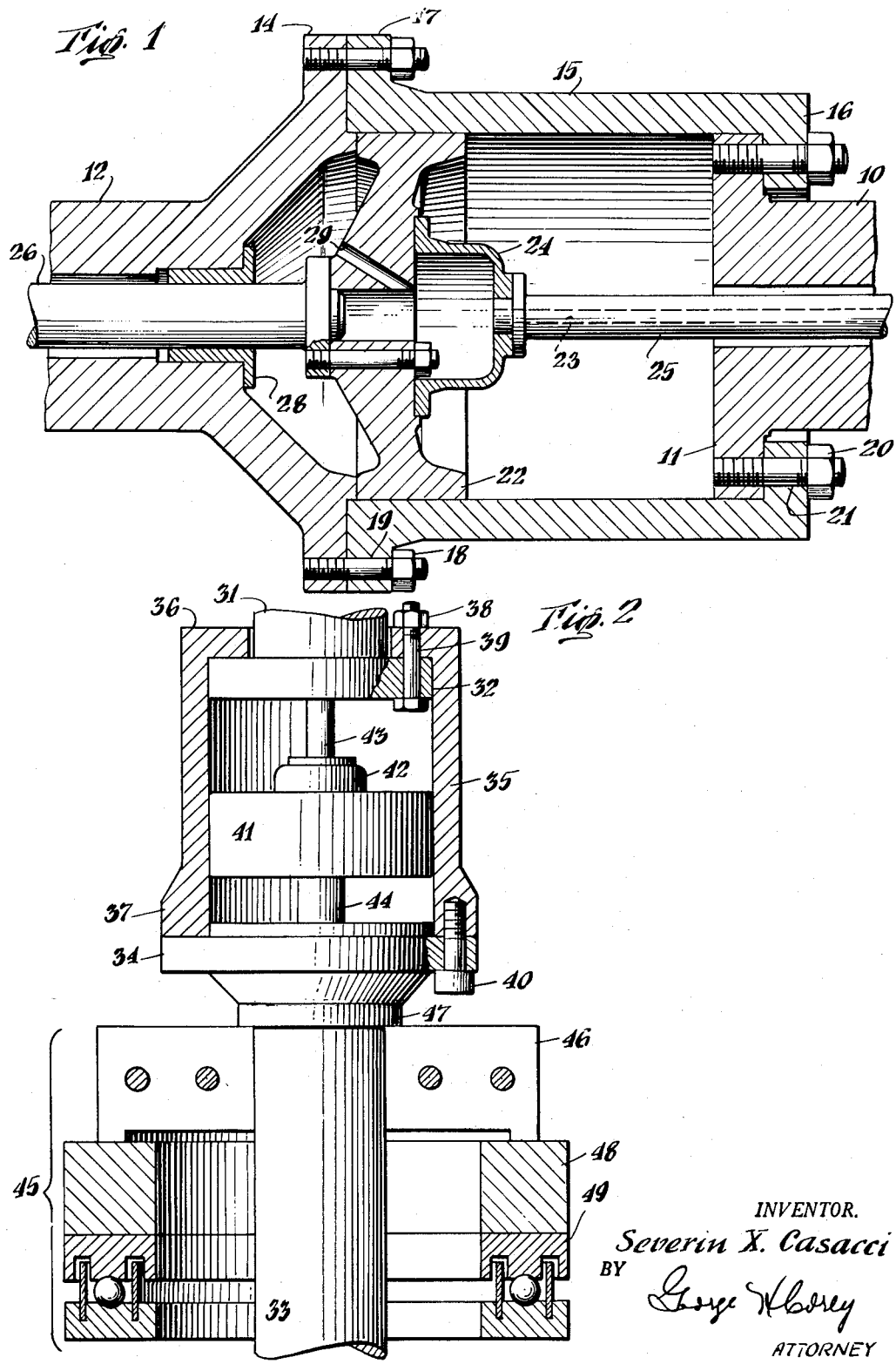

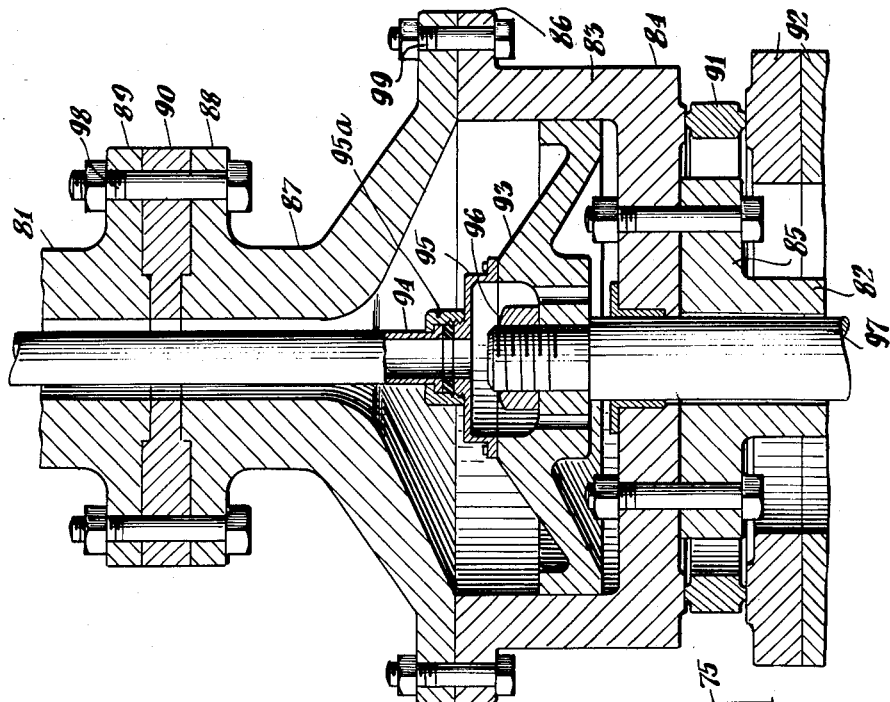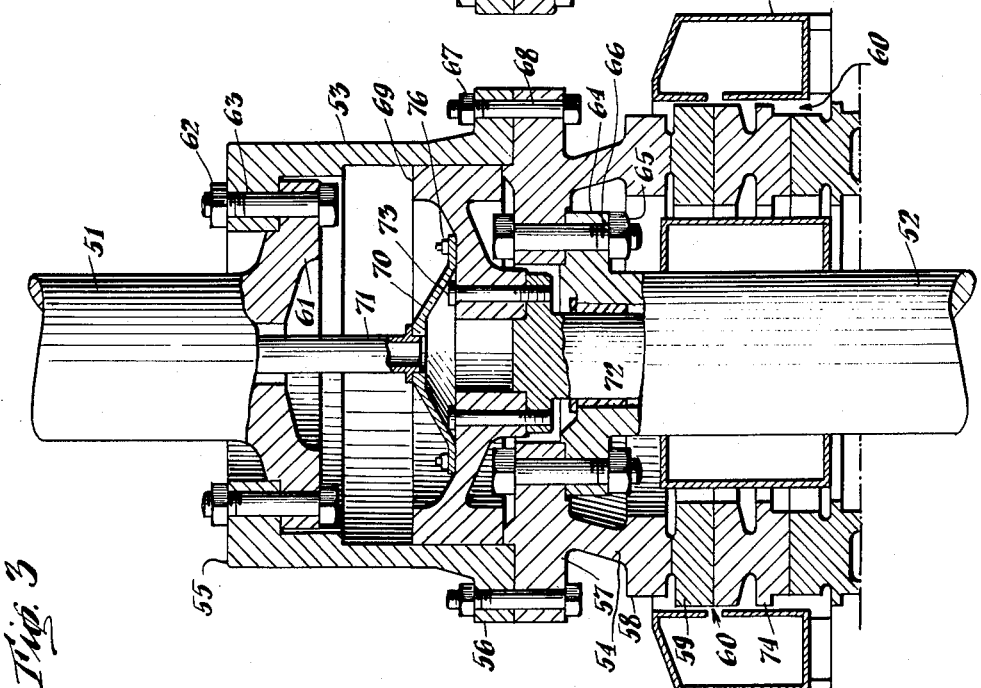

2,756,018

COMBINED DRIVING CONNECTION AND SERVO-MOTOR UNIT, PARTICULARLY FOR USE IN HYDROELECTRIC TURBINE-GENERATOR INSTALLATIONS

Severin Xavier Casacci, Grenoble, France, assignor to Etablissements Neyrpic, Grenoble, France, a corporation of France Application October 17, 1952, Serial No. 315,316

Claims priority, application France October 18, 1951

11 Claims. (Cl. 253—22)

This invention relates to improvements in driving connections between a driving and a driven shaft mounted for rotation in axial alignment, such as, for example, the driving shaft of a water turbine and the rotor shaft of an electric generator associated therewith to form a hydroelectric turbine-generator unit. More particularly, the invention relates to connections between two axially aligned, hollow rotatable shafts having associated therewith a servo-motor which is connected through one of the shafts to a source of power and is connected through the other shaft to means for applying power to a useful purpose such as the control or adjustment of an operating mechanism associated with one of the shafts.

In hydro-electric turbine-generator installations, the turbine shaft and the rotor shaft of the generator are often connected by an intermediate shaft in order to make it easier to assemble and disassemble the several elements of the turbine-generator unit.

In the Kaplan-type turbine with movable blades the regulation of the pitch of the blades is accomplished by the use of a connecting rod which extends lengthwise of the aligned hollow shafts of the turbine-generator unit. This rod is moved by the piston of an oil operated servo-motor of which the cylinder is usually formed by an enlarged section integral with and forming a part of the rotor shaft of the generator.

It is an object of the present invention to provide an improved driving connection between a pair of axially aligned rotatable shafts, and more particularly between a hollow turbine driving shaft aligned with a hollow driven shaft of an electric generator, which insures a positive driving connection of the two shafts and which at the same time may be easily dismantled and removable without necessitating movement or displacement of the connected driving and driven shafts. The improved connection also permits removal of one or the other of the two shafts and the turbine or the generator connected therewith without disturbing the other elements of the installation.

It is a further object of the invention to provide such a driving connection which includes a hollow cylinder serving both as an intermediate shaft to connect the turbine driving shaft and the generator rotor shaft and as the cylinder of a fluid operated servo-motor. A piston housed within the cylinder is connected through a connecting rod to the adjustable turbine blades and is actuated for movements along the cylinder by a fluid supplied under pressure through the hollow driven rotor shaft of the generator.

It is a further feature and object of the invention to bring the servo-motor closer to the turbine blades that are to be controlled or regulated by it, thus shortening the connecting rod.

It is a still further object of the invention to dispose the servo-motor intermediate the generator and the turbine and in this way make it possible to remove or dismantle the generator without interference from the connecting rod and without disconnecting the servo-motor piston or removing the connecting rod.

It is a still further feature and object of the invention to provide a driving connection between vertically aligned driving and driven shafts, such as those of a turbine and the rotor shaft of a generator, wherein the connection includes a hollow cylindrical intermediate shaft which not only serves as the cylinder of a servo-motor but also at the same time acts in place of the ring of a thrust bearing to receive the weight of the rotor and the hydraulic thrust imparted lengthwise of the turbine shaft and to transmit the resulting combined thrust to appropriate elements of a thrust bearing associated therewith. This thrust bearing is made easily accessible without interfering with the turbine or generator.

Further objects and advantages of the invention will become apparent from the ensuing description and from the accompanying drawings, wherein:

Fig. 1 is a longitudinal view partly in section of one embodiment of the present invention.

Fig. 2 is a longitudinal view partly in section of a pair of vertically disposed and aligned shafts which are connected together in accordance with the invention and wherein the connection is associated with a thrust bearing which is made readily accessible because of the improved connection.

Fig. 3 is a view, partly in section, of another form of the connection and servo-motor between vertically aligned shafts in association with and forming a part of an improved thrust bearing.

Fig. 4 is a view partly in section of still another embodiment of the connection and servo-motor assembly in association with complementary elements of a thrust bearing.

Figure 5:
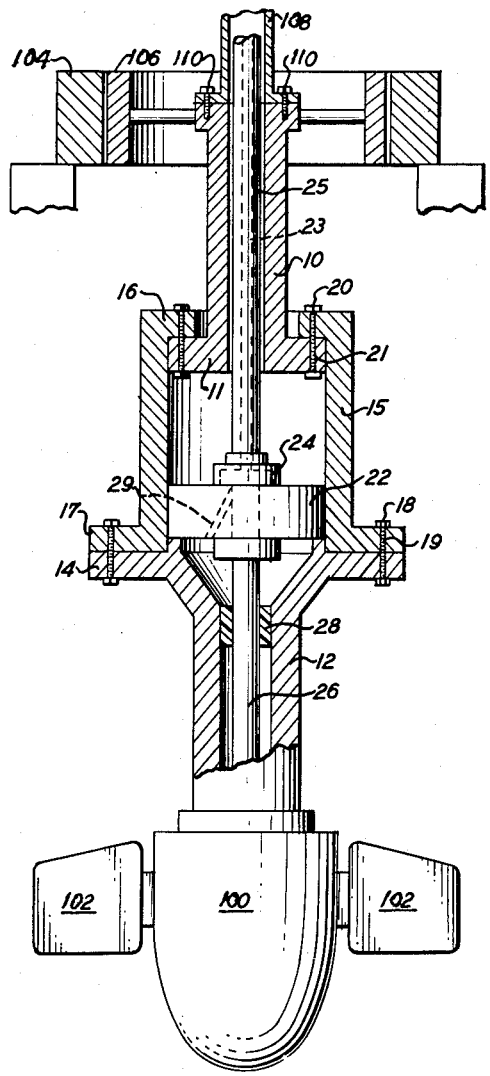
Fig. 5 shows the device of Fig. 1 connecting a vertical turbine to a generator.

Referring now to the drawings and to Figs. 1 and 5 in particular, there are shown therein a pair of axially aligned shafts having their proximate ends in spaced relation. The shafts may be either horizontally or vertically disposed but hereinafter will be described with particularity to their disposition in vertical alignment as in a turbine and generator installation, the turbine having a rotor 100 and blades 102 supported adjustably thereon and the generator having a stator 104 and a rotor 106 rotatable on the axis of the turbine rotor 100. As illustrated in Figs. 1 and 5, the hollow generator shaft 10 connected at its upper end to the generator rotor 106 is outwardly flanged at 11, and is connected to hollow turbine shaft 12 which is outwardly flanged at 14. The connection between shafts 10 and 12 is effected by a hollow cylinder 15, which is inwardly flanged at the generator end 16 and outwardly flanged at the turbine end 17. The externally flanged portion 17 of cylinder 15 and flange 14 of turbine shaft 12 are connected by means of nuts 18 and bolts 19. At the other end of cylinder 15, the inwardly flanged end 16 is connected to flange 11 of generator shaft 10 by means of nuts 20 and bolts 21. Piston 22 is located within cylinder 15 in piston-cylinder relationship and adapted to move therein between the faces of flanged ends 11 and 14.

Hub 24 is connected to the generator side of piston 22 and, in turn, hub 24 is connected to the hollow rod or pipe 25 which extends axially within the hollow portion of generator shaft 10. Rod 26, operatively connected by conventional means not shown to the turbine blades for controlling the turbine blades, is connected to the turbine side of piston 22 and extends within the hollow portion of shaft 12. A packing gland or stuffing box 28 is disposed intermediate shaft 26 and shaft 12 to insure a fluid tight fit. The connections between piston 22, control rod 26 and hub 24 are all made by the use of nuts and bolts or screws so as to permit ready disassembly of the component parts. Similarly the connection between hub 24 and hollow rod 25 is also made by the use of nuts, bolts or screws (not shown). Fluid, such as oil under pressure, to move piston 22 in one direction is admitted into cylinder 15 through tube 108 secured by tap bolts 110 to and rotating with the generator shaft 10 and provided with a conventional gland or other means to confine the fluid to flow through the annular passageway provided between shaft 10 and rod 25. To move piston 22 in the other direction fluid pressure is exerted upon the opposite side of piston 22 by admitting fluid similarly into fluid conduit 23 provided within rod 25, then through hub 24 and conduit 29 which passes through piston 22.

In disassembling the apparatus illustrated in Figs. 1 and 5, either in whole or in part, the following procedure may be followed: Nuts 18 and 20 are removed and cylinder 15 is then moved up (toward the right) and along shaft 10 to permit access to the piston assembly. Hub 24 and rod 25 may then be disconnected from each other, whereupon rod 25 may be moved back within shaft 10 if desired by suitable disconnection at its opposite end. The connection between piston 22 and hub 24 can then be removed. Afterwards, the connection between rod 26 and piston 22 may be removed with the result that piston 22 can then be removed off to the side, and rod 26 can be pushed back into shaft 12 by suitable disconnection at its opposite end.

Referring now to Fig. 2 of the drawing, there is illustrated a connection in accordance with this invention between vertically positioned and aligned shafts wherein the connection is associated with a thrust bearing secured thereto and transmits the hydraulic thrust and the weight of the generator rotor thereto. As illustrated, a vertically disposed hollow generator shaft 31 having an outwardly flanged lower end 32 is connected by a cylinder or sleeve 35 to the hollow turbine shaft 33 which is outwardly flanged at its upper end 34. Sleeve 35 is inwardly flanged at its upper end 36 and outwardly flanged at its lower end 37. The upper end 36 is connected by means of nuts 38 and bolts 39 to the shaft 31 at its lower end 32. The lower end 37 of sleeve 35 is connected to the flanged upper end 34 of shaft 33 by means of screws 40. Piston 41 is located and operative within sleeve 35. Hub 42 and connecting rods 43 and 44 are connected to piston 41 in the manner indicated with reference to rods 25 and 26 and piston 22 of Fig. 1 and operate in the same manner. The thurst bearing assembly is generally indicated at 45 and is connected to shaft 33 so as to receive thrust therefrom by means of split ring 46 which is made up of at least two pieces clamped on shaft 33 by bolts 50, the upper surface of split ring 46 abutting against shoulder 47 of the flange 34 of shaft 33. Thrust is transmitted from the ring or collar 46 to rotatable pieces or rings 48 and 49 and then to the ball bearings of the bearing assembly.

It is pointed out that as illustrated in Fig. 2, flanged end 32 of shaft 31 is positioned within cylinder 35. Also the inside diameter of cylinder 35 is such as to permit it to slide along the outside of the flanged end 32. Furthermore, it is pointed out that as illustrated in Fig. 2, the elements of the bearing assembly have an inside diameter greater than the outside diameter of flanged end 34 of shaft 33.

In the disassembly of the apparatus, after ring or collar 46 has been removed, screws 40 can be removed. If desired the shoulder 47 can be made of such height, or thickness, as to position the flange 34 a sufficient distance above the ring 46 to make it unnecessary to remove such ring to gain access to and remove screws 40. The disassembly of cylinder 35 from shafts 31 and 33 as well as piston 41, hub 42 and rods 43 and 44 then proceeds in the same manner as described with reference to cylinder 15 and shafts 10 and 12 of Fig. 1. The elements of the bearing 45 can then be removed by lifting them up and over flanged end 34. It is pointed out that the disassembly of the connection and associated elements illustrated in Fig. 2 as well as in Fig. 1 can be done without moving or displacing the generator or turbine shafts.

Referring now to Fig. 3, hollow generator shaft 51 is connected to turbine shaft 52 by means of cylinder 53 and the flanged annular spool 54. Cylinder 53 is inwardly flanged at its upper end 55 and is outwardly flanged at its lower end 56. Spool 54 is outwardly and inwardly flanged at its upper end 57. Its lower end 58 bears directly upon the movable ring 59 of the thrust bearing assembly generally indicated at 60.

The lower outwardly flanged end 61 of generator shaft 51 is connected by means of nuts 62 and bolts 63 to the upper end of cylinder 53. The upper outwardly flanged end 64 of turbine shaft 52 is connected to the inwardly flanged portion of upper end 57 of spool 54 by means of nuts 65 and bolts 66, while the outwardly flanged portion of the upper end 57 of spool 54 is connected to the lower end of cylinder 53 by means of nuts 67 and bolts 68. Piston 69 is located within cylinder 53 in piston-cylinder relationship. Hub 70 is connected to the generator side of piston 69. Control rod 71 extending upwardly within shaft 51 is connected to the other side of hub 70. Control rod 72 is connected to the lower side of piston 69 by suitable means such as screws 73. Piston 69 moves within cylinder 53 under the application of fluid pressure upon one side of the piston or the other, as in the manner indicated with respect to piston 22 of Fig. 1.

It is pointed out that spool 54 serves not only as a support for turbine shaft 52 but also is part of the housing within which piston 69 operates. Spool 54 also serves to transmit the thrust or the weight of turbine shaft 52 directly upon the bearing assembly. This thrust is received by ring 74 of the bearing assembly 60. Cover 75 acts as the oil shield for the bearing assembly.

The arrangement as illustrated in Fig. 3 and described hereinabove has the advantage that the overall height of the connection between the turbine shaft and the generator shaft is reduced and at the same time the disassemly and assembly of the connection and associated elements can be carried out without moving the rotors or shafts of the turbine or generator.

In order to gain access to the piston or to carry out necessary repairs and maintenance of the connection, it is only necessary to remove nuts 62 and 67 and bolts 68. Sleeve 53 is then pushed upwardly toward and along generator shaft 51. This allows disconnection of hub 70 which is connected to piston 69 by means of screws 76. Afterwards, hub 70 may be unscrewed or otherwise disconnected from hollow rod 71. Rod 71 may then be pushed up into generator shaft 51 and after the removal of screws 73, piston 69 may be separated from control rod 72 and removed by simply lifting it up and moving it out sidewise. When this is done, the entire group may now be disassembled.

Referring now to Fig. 4, there is illustrated a connection similar to that shown in the preceding figures, especially Fig. 3. In this connection the cylinder within which the piston operates directly transmits the thrust or weight of the assembly to the bearing. There is no bearing ring or spool such as 54 of Fig. 3 disposed intermediate the cylinder and the bearing.

In accordance with Fig. 4, hollow generator shaft 81 is connected to hollow turbine shaft 82 by means of a removable connection which comprises a cylinder 83 inwardly flanged on its lower end 84 and connected to the upper flanged end 85 of turbine shaft 82. Connected to the upper outwardly flanged end 86 of cylinder 83 is a generally cylindrical and conical spool piece 87. The upper end 88 of spool piece 87 is connected to the lower flanged end 89 of generator shaft 81. Disposed intermediate the connection between generator shaft 81 and spool piece 87 is a split spacing ring 90.

The lower end of cylinder 83 is supported by ring 91 which in turn bears upon thrust bearing assembly 92. As in all preceding figures, a piston 93 is disposed and operates within cylinder 83, being connected on its upper side to hollow rod 94 by means of hub 95 and the ring nut 95a, and being connected by means of nut 96 to control rod 97 which extends downwardly within shaft 82. In the disassembly of the apparatus as illustrated in Fig. 4, bolts 98 and 99 are removed from the flanges of spool piece 87. When bolts 98 are removed this allows the split ring 90 to be taken out from between the generator 81 and spool piece 87. Spool piece 87 is then moved up along rod 94 sufficiently to allow the rod 94 to be disconnected from hub 95.

Rod 94 after being released from hub 95 may then be pushed up within generator shaft 81 to clear the spool piece 87 which is then withdrawn sidewise. The disassembly of the remainder of the equipment is then substantially the same as described with reference to Fig. 3.

The embodiments described above are set forth by way of example. It will be understood that various changes may be made in the construction involved without departing from the spirit and scope of the invention which is not to be deemed as limited otherwise than as indicated by the language of the appended claims.

I claim:

1. A power transmission apparatus comprising a driving shaft and a driven shaft mounted for rotation in axial alignment with each other, a hollow cylinder disposed coaxially with said shafts and between and connecting in driving relation the proximate ends of said shafts disposed in spaced relation along the common axis thereof, said cylinder carrying a wall extending transversely of and inwardly toward said axis and extending about a given one of said shafts, said given shaft having a portion extending outwardly thereof and disposed within said cylinder at the side of said wall toward the other shaft, and means for rigidly and removably connecting said outwardly extending portion of said given shaft to said inwardly extending wall of said cylinder, said cylinder having an internal diameter not less than the outer diameter of said outwardly extending portion of said given shaft for the full axial length of said cylinder from said inwardly extending wall, so that said cylinder when disconnected from said shafts is slidable lengthwise along said given shaft in the direction away from said other shaft to permit access to said adjacent ends of said shafts.

2. A power transmission apparatus as defined in claim 1 which comprises a thrust bearing having a thrust supporting element and an element rotatable on the common axis of said shafts between and in thrust transmitting relation to said cylinder and said thrust supporting element of said thrust bearing.

3. A power transmission apparatus as defined in claim 2 in which said rotatable element of said thrust bearing is carried by said other shaft and is connected to said cylinder for transmitting to said thrust supporting element the thrust of said connected shafts.

4. A power transmission apparatus as defined in claim 1 in which said shafts are hollow about the common axis thereof which comprises a piston having its diameter corresponding to said internal diameter of said cylinder and axially slidably movable within said cylinder, a piston rod connected to one side of said piston and extending into the hollow shaft on said side of the piston, and conduit means within at least one of said shafts and connected to the respective spaces in said cylinder at the opposite sides of said piston for supplying fluid under pressure for effecting movement of said piston.

5. A power transmission apparatus comprising a hollow driving shaft and a hollow driven shaft mounted for rotation in axial alignment, a hollow cylinder rigidly connecting said shafts with the proximate ends of said shafts disposed in longitudinally spaced relation, said cylinder being inwardly flanged at one end and outwardly flanged on the other end and having an internal diameter large enough to fit over the end of that one of said shafts which is connected to the inwardly flanged end of said cylinder, a fluid-actuatable piston disposed within said cylinder and between said first and second shafts, and a piston rod connected to one side of said piston and extending within and lengthwise of the one of said shafts on the corresponding side of the piston, and means for applying fluid pressure to said piston through the hollow shaft on the opposite side of said piston.

6. A power transmission as claimed in claim 5 wherein the driving and driven shafts are mounted in vertical axial alignment.

7. A power transmission as claimed in claim 6 wherein a thrust bearing is mounted adjacent and beneath the lower end of said cylinder to receive bearing thrusts transmitted by said cylinder when said cylinder is connected to said shafts.

8. A power transmission as claimed in claim 7 wherein said cylinder when disconnected from said shafts is movable axially along the shaft connected to the inwardly flanged end of said cylinder to permit access to said thrust bearing.

9. In a hydraulic turbine installation having a driving shaft and a driven shaft mounted for rotation in axial alignment with each other, the turbine rotor blades being adjustable, a hollow cylinder disposed coaxially with said shafts and between and connecting in driving relation the proximate ends of said shafts disposed in spaced relation along the common axis thereof, said cylinder carrying a wall extending transversely of and inwardly toward said axis and extending about a given one of said shafts, said given shaft having a portion extending outwardly thereof and disposed within said cylinder at the side of said wall toward the other shaft, means for rigidly and removably connecting said outwardly extending portion of said given shaft to said inwardly extending wall of said cylinder, said cylinder having an internal diameter not less than the outer diameter of said outwardly extending portion of said given shaft for the full axial length of said cylinder from said inwardly extending wall, so that said cylinder when disconnected from said given shaft is slidable lengthwise along said given shaft in the direction away from said other shaft, a piston having its diameter corresponding to said internal diameter of said cylinder and axially slidably movable within said cylinder, means connecting said piston to the blades of said turbine rotor for adjusting the position of said blades concomitantly with axial movement of said piston, and means for applying fluid pressure selectively to the opposite sides of said piston to move said piston axially in one direction and the other within said cylinder.

10. In a power transmission apparatus comprising a lower hollow driving shaft and an upper hollow driven shaft mounted for rotation in vertical axial alignment; means rigidly connecting the ends of said shafts comprising in combination a hollow cylinder, the upper end of said hollow cylinder being inwardly flanged and connected to the lower end of said upper shaft and the lower end of said cylinder being outwardly flanged; a second hollow cylindrical member disposed between said cylinder and said lower shaft, the upper end of said second cylindrical member having an inwardly flanged portion and an outwardly flanged portion, said outwardly flanged portion of said second cylindrical member being rigidly connected to the outwardly flanged lower end of said cylinder and said inwardly flanged portion of said second cylindrical member being rigidly connected to said lower shaft, the lower end of said second cylindrical member encircling the upper end of said lower shaft; a fluid-actuatable piston disposed within said hollow cylinder in sliding contact with the inside wall surface thereof, a piston rod connected to one side of said piston and extending within said lower driving shaft, and means for applying fluid pressure to said piston through said upper driven shaft.

11. In a power transmission apparatus comprising a lower hollow driving shaft and an upper hollow driven shaft mounted for rotation in vertical axial alignment; means rigidly connecting said shafts comprising in combination, a hollow generally cylindrical spool outwardly flanged on its upper and lower ends, a two-piece removable ring disposed between the upper end of said spool and the lower end of said upper shaft, a hollow cylinder outwardly flanged on its upper end and inwardly flanged at its lower end and disposed between the lower end of said spool and the upper end of said lower shaft, the upper end of said cylinder being rigidly connected to the lower end of said spool and the lower end of said cylinder being rigidly connected to the upper end of said lower shaft, a fluid-actuatable piston in sliding contact with the inside surface of said cylinder disposed within said cylinder and operative between the upper and lower ends thereof, a piston rod connected to one side of said piston and extending lengthwise within the shaft adjacent said one side of said piston, and means for applying fluid pressure to said piston through the shaft adjacent the opposite side of said piston.

References Cited in the file of this patent

UNITED STATES PATENTS

| | | |
|---|---|---|
| 1,543,171 | Losel | June 23, 1925 |
| 1,656,149 | Hopkins | Jan. 10, 1928 |
| 1,684,063 | Miller | Sept. 11, 1928 |
| 2,085,909 | Jessup et al. | July 6, 1937 |
| 2,420,626 | Stevenson | May 13, 1947 |

FOREIGN PATENTS

| | | |
|---|---|---|
| 117,358 | Sweden | Oct. 1, 1946 |
| 229,677 | Switzerland | Feb. 1, 1944 |
| 278,099 | Switzerland | Sept. 30, 1951 |
| 576,694 | Germany | May 12, 1933 |